(12) United States Patent
Hung (10) Patent No.: US 11,340,518 B2
(45) Date of Patent: May 24, 2022

(54) PROJECTION SYSTEM AND PROJECTION OPERATION METHOD

(71) Applicant: Coretronic Corporation, Hsin-Chu (TW)

(72) Inventor: Wei-Lun Hung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/224,091

(22) Filed: Apr. 6, 2021

(65) Prior Publication Data

US 2021/0318596 A1 Oct. 14, 2021

(30) Foreign Application Priority Data

Apr. 10, 2020 (CN) .......................... 202010277349.5

(51) Int. Cl.
| | |
|---|---|
| *G03B 21/14* | (2006.01) |
| *G03B 21/606* | (2014.01) |
| *G09F 19/18* | (2006.01) |
| *G03B 21/10* | (2006.01) |

(52) U.S. Cl.
CPC ............ *G03B 21/145* (2013.01); *G03B 21/10* (2013.01); *G03B 21/606* (2013.01); *G09F 19/18* (2013.01)

(58) Field of Classification Search
CPC .... G03B 21/145; G03B 21/10; G03B 21/606; G09F 19/18
USPC ......................................................... 353/119
See application file for complete search history.

(56) References Cited

U.S. PATENT DOCUMENTS

| | | | |
|---|---|---|---|
| 6,467,908 B1 | 10/2002 | Mines et al. | |
| 8,256,904 B2 | 9/2012 | Reichow et al. | |
| 9,810,975 B2 | 11/2017 | Mahoor et al. | |
| 2016/0323553 A1 | 11/2016 | Fuchs et al. | |

FOREIGN PATENT DOCUMENTS

| | | | | |
|---|---|---|---|---|
| CN | 108172156 | | 6/2018 | |
| CN | 109478247 | | 3/2019 | |
| JP | 2006212717 A | * | 8/2006 | |
| WO | 2017033565 | | 3/2017 | |
| WO | 2017056520 | | 4/2017 | |
| WO | WO-2017171610 A1 | * | 10/2017 | ............ B25J 19/023 |

* cited by examiner

*Primary Examiner* — Jerry L Brooks
(74) *Attorney, Agent, or Firm* — JCIPRNET (57) ABSTRACT

The disclosure provides a projection system and a projection operation method. The projection operation method causes the projection device disposed inside the biologically-modeled housing to project the facial image onto the face projection area of the biologically-modeled housing. The face projection area is light-transmissive and curved. The controller identifies the voice signal received by the sound-receiving device. When the controller obtains the identification result, if the projection data stored in the storage device includes the target projection data corresponding to the identification result, the controller controls the projection device to project the facial image according to the target projection data, or, if the projection data stored in the storage device does not include the target projection data, the controller controls the communication device to receive the target projection data from the external device and stores it in the storage device.

15 Claims, 8 Drawing Sheets

PROJECTION SYSTEM AND PROJECTION OPERATION METHOD

CROSS-REFERENCE TO RELATED APPLICATION

This application claims the priority benefit of China application serial no. 202010277349.5, filed on Apr. 10, 2020. The entirety of the above-mentioned patent application is hereby incorporated by reference herein and made a part of this specification.

BACKGROUND OF THE DISCLOSURE

Field of the Disclosure

The disclosure relates to a projection display technology, and in particular to a projection system and a projection operation method, which are configured to cause a projection device disposed inside a biologically-modeled housing to project a facial image onto a face projection area of the biologically-modeled housing.

Description of Related Art

The facial expression or appearance of a conventional stereoscopic biological model is fixed and cannot be changed freely, nor can it display a dynamic display effect. Therefore, if it is possible to provide a stereoscopic biological model that changes the facial expression or appearance according to the user's wishes and has the function of dynamic/static display, the stereoscopic biological model will be more vivid and help to improve the user experience.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE DISCLOSURE

The disclosure provides a projection system and a projection operation method, which have the functions of changing the facial image of a stereoscopic model through voice control and providing a variety of different facial images.

Other purposes and advantages of the disclosure can be further understood from the technical features disclosed by the disclosure.

In order to achieve one or some or all of the above purposes or other purposes, an embodiment of the disclosure provides a projection system. The projection system includes a biologically-modeled housing, a projection device, a sound-receiving device, a controller, a communication device and a storage device. The biologically-modeled housing includes a face projection area. The face projection area is light-transmissive and curved. The projection device is disposed inside the biologically-modeled housing and is configured to project the facial image to the facial projection area. The sound-receiving device is configured to receive voice signals. The storage device is configured to store multiple projection data. The controller is electrically connected with the projection device, the sound-receiving device, the communication device and the storage device. The controller is configured to identify the voice signal, and when the controller obtains the identification result according to the voice signal, if the projection data includes the target projection data corresponding to the identification result, the controller selects the target projection data from the projection data and controls the projection device to project the facial image according to the target projection data. Alternatively, if the projection data does not include the target projection data, the controller controls the communication device to receive the target projection data from the external device and stores the target projection data in the storage device, and the controller controls the projection device to project the facial image according to the target projection data.

In order to achieve one or some or all of the above purposes or other purposes, an embodiment of the disclosure provides a projection operation method for projecting facial images. The projection operation method includes the following steps: receiving a voice signal through a sound-receiving device; identifying a voice signal through a controller; when an identification result is obtained through the controller according to the voice signal, if multiple projection data stored in the storage device contains target projection data corresponding to the identification result, selecting the target projection data from the projection data by the controller, or if the projection data does not include the target projection data, controlling the communication device to receive the target projection data from the external device by the controller and storing the target projection data in the storage device; and controlling the projection device to project the facial image to the face projection area by the controller according to the target projection data, wherein the face projection area is located at the biologically-modeled housing, and the face projection area is light-transmissive and curved, wherein the projection device is disposed inside the biologically-modeled housing.

Based on the above, the embodiments of the disclosure have at least one of the following advantages or effects. The projection system and the projection operation method of the disclosure obtain a voice signal through a sound-receiving device, and select the target projection data to be projected according to the voice signal. When the target projection data is not built in the projection system, the communication device spontaneously downloads the target projection data corresponding to the voice signal from the external device, and stores the downloaded target projection data in the storage device. Therefore, the projection system and the projection operation method of the disclosure have the function of changing the facial image of the stereoscopic model through voice control and providing a variety of different facial images.

Other purposes, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
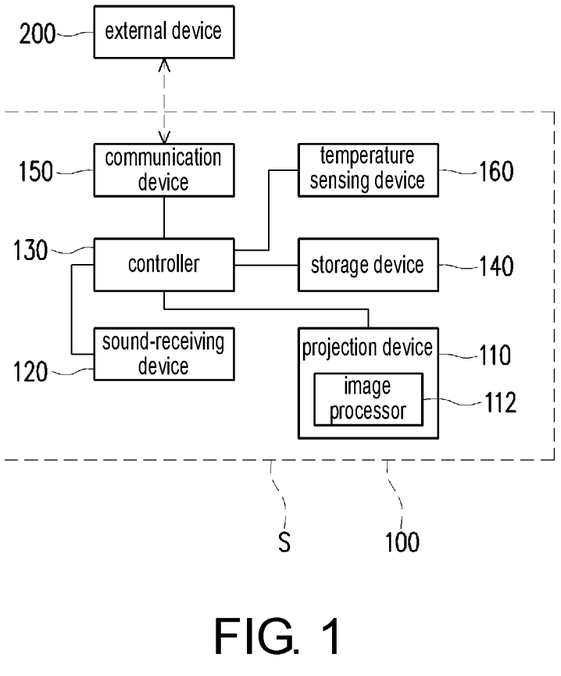
FIG. 1 is a block diagram of a projection system according to an embodiment of the disclosure.
Figure 2:
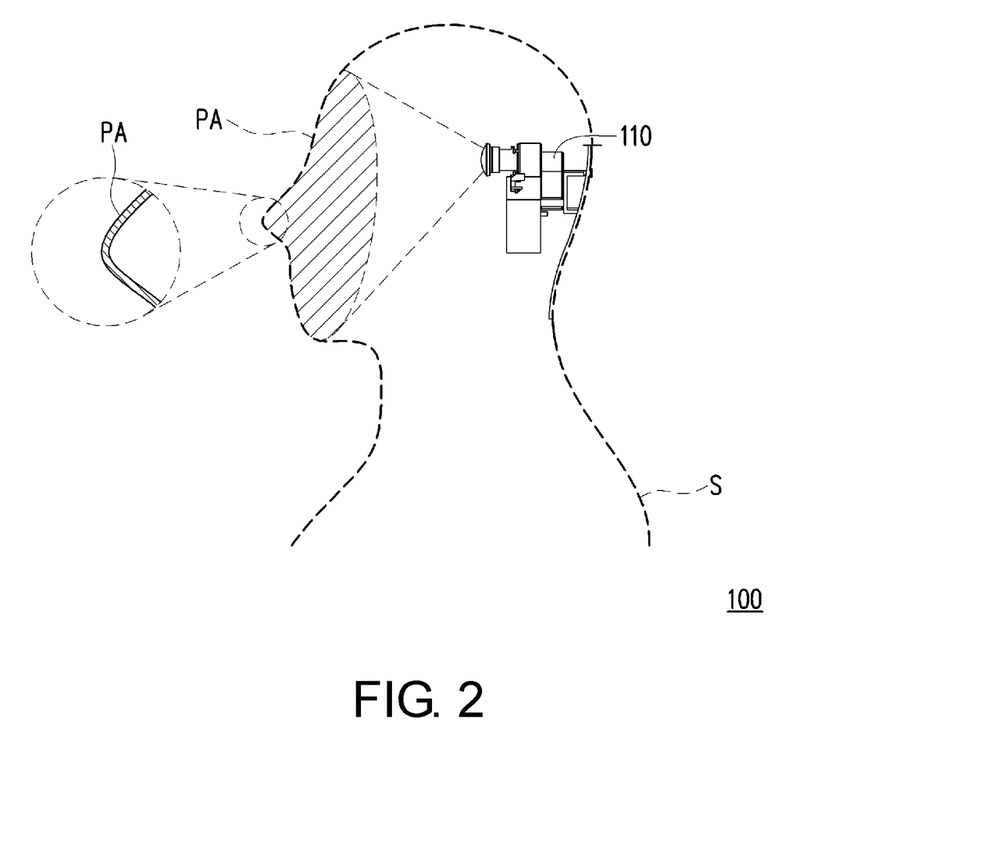
FIG. 2 is a schematic view of the projection state of a projection system 100 of FIG. 1.

FIG. 1 is a block diagram of a projection system according to an embodiment of the disclosure. FIG. 2 is a schematic view of the projection state of a projection system 100 of FIG. 1. Please refer to FIG. 1 and FIG. 2. The projection system 100 at least includes a biologically-modeled housing S, a projection device 110, a sound-receiving device 120, a controller 130, a storage device 140, and a communication device 150. The controller 130 is electrically connected to the projection device 110, the sound-receiving device 120, the communication device 150 and the storage device 140. To simplify the illustration, FIG. 2 does not show the sound-receiving device 120, the controller 130, the storage device 140, and the communication device 150. In order to clearly show the components inside the biologically-modeled housing S, the biologically-modeled housing S is shown by dashed-lines. In this embodiment, the appearance of the biologically-modeled housing S is the shape of a human, including a human head. In other embodiments, the appearance of the biologically-modeled housing S may be an animal or the head of a cartoon character. The disclosure provides no limitation to the appearance of the biologically-modeled housing S.

To further explain, in FIG. 1, the components 120 to 150 are all shown inside the biologically-modeled housing S, but such configuration is not necessarily required. In other embodiments, the controller 130, the storage device 140, and the communication device 150 may be disposed at the bottom base of the biologically-modeled housing S or outside the biologically-modeled housing S, and are connected to the projection device 110 and the sound-receiving device 120 by means of wired or wireless communication. In addition, the sound-receiving device 120 can be disposed at any part of the biologically-modeled housing S or outside the biologically-modeled housing S, and the disclosure is not limited thereto.

Specifically, the controller 130 is, for example, a central processing unit (CPU), or other programmable general-purpose and special-purpose microprocessor, digital signal processor (DSP), programmable controllers, application specific integrated circuits (ASICs) or other similar components or combinations of the above components, the disclosure is not limited thereto. The storage device 140 is, for example, a removable random access memory (RAM), a read-only memory (ROM), a flash memory, or the like, or a combination thereof. The storage device 140 is configured to store multiple projection data, and other data or program codes for executing the projection system 100. The projection data may be static images or dynamic images.

Please refer to FIG. 2, the biologically-modeled housing S includes a face projection area PA, that is, the face projection area PA is located at the biologically-modeled housing S. The projection device 110 is disposed inside the biologically-modeled housing S, and projects a facial image to the face projection area PA. The face projection area PA is located, for example, at the head of the biologically-modeled housing S, and the face projection area PA is light-transmissive (e.g., translucent) and curved. For example, the projection device 110 is a rear-projection type projection device, and the face projection area PA is a rear-projection optical film with a stereoscopic facial feature contour, as shown in the partially enlarged schematic view in FIG. 2.

The sound-receiving device 120 is configured to receive the voice signal (sound) from the user, which is a microphone, for example. The controller 130 can identify the voice signal received by the sound-receiving device 120. When the controller 130 obtains the identification result according to the voice signal, if the projection data in the storage device 140 includes target projection data corresponding to the identification result, the controller 130 selects the target projection data from the projection data and controls the projection device 110 to project facial images according to the projection data. If the projection data in the storage device 140 does not include the target projection data, the controller 130 controls the communication device 150 to receive the target projection data from the external device 200 (shown in FIG. 1) and stores the target projection data in the storage device 140. The controller 130 also controls the projection device 110 to project the facial image according to the target projection data.

In detail, the storage device 140 also stores a lookup table. The lookup table can record preset voice instructions and projection data to be projected. After obtaining the identification result of the voice signal, the controller 130 can select the target projection data corresponding to the identification result through the lookup table. The content of the voice signal includes descriptions of facial expressions, descriptions of appearance, descriptions of emotions or characters, etc. Descriptions of facial expressions include, for example, raising eyebrows, frowning, smiling, laughing, crying, etc. Descriptions of appearance include, for example, skin color, facial features, gender, etc. Descriptions of emotions include, for example, joy, anger, sorrow, happiness, etc. Characters include, for example, cartoon characters or real people.

Figure 3A:
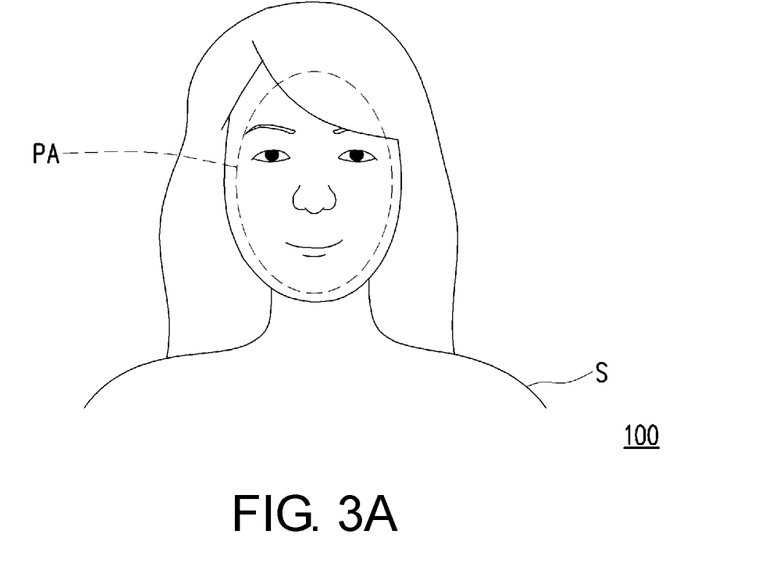
FIG. 3A is a schematic view of a facial image according to an embodiment of the disclosure.
Figure 3B:
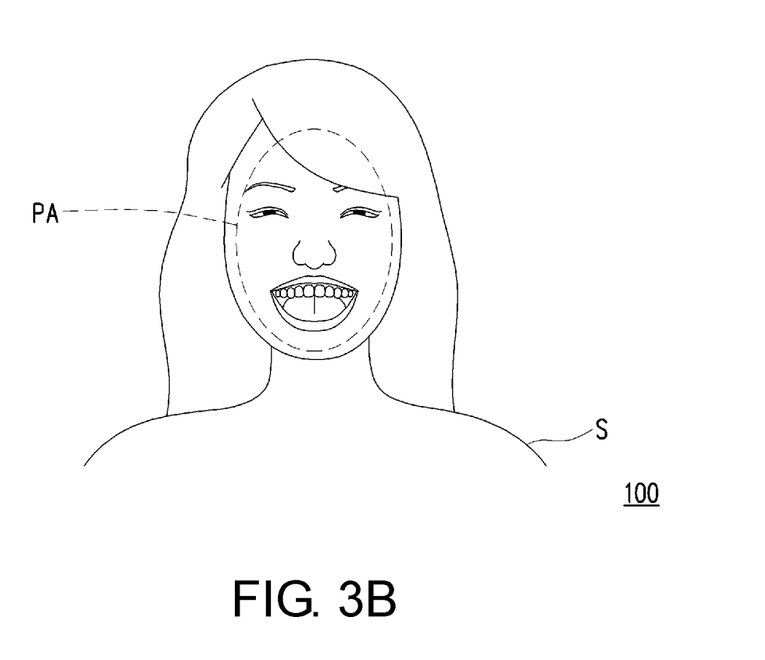
FIG. 3B is a schematic view of a facial image according to another embodiment of the disclosure.

FIG. 3A is a schematic view of a facial image according to an embodiment of the disclosure, and FIG. 3B is a schematic view of a facial image according to another embodiment of the disclosure. In an embodiment, the lookup table records the corresponding relationship between multiple descriptions of expressions and multiple projection data, as shown in Table 1 below.

TABLE 1

| Voice signal | Frowning | Crying | Smiling | Laughing |
| --- | --- | --- | --- | --- |
| Number of projection data | #001 | #002 | #003 | #004 |

In consideration of costs, the capacity of the storage device 140 may be limited, and therefore the storage device 140 does not store all projection data in the lookup table, for example, only stores projection data #001, #002 and #003 without storing projection data #004. In the embodiment of FIG. 3A, after the user gives an instruction to the sound-receiving device 120, the controller 130 identifies that the voice signal includes the keyword "smile", and the controller 130 obtains the target projection data #003 through the lookup table. Next, the controller 130 reads the target projection data #003 from the storage device 140, and controls the projection device 110 to project a smiling facial image onto the face of the biologically-modeled housing S according to the target projection data #003. In the embodiment of FIG. 3B, the user speaks the keyword "laugh" to the sound-receiving device 120, the controller 130 identifies the voice signal and finds the projection data #004 as the target projection data through the lookup table. However, the target projection data #004 is not stored in the storage device 140, and therefore the controller 130 further controls the communication device 150 to connect to the external device 200 through the network, and downloads the projection data #004 from the external device 200. Finally, the controller 130 controls the projection device 110 to project the laughing facial image onto the face of the biologically-modeled housing S according to the target projection data #004.

Here, the communication device 150 is, for example, a wireless communication device supporting various wireless communication standards such as Bluetooth, WiFi, Global Interoperability for Microwave Access (WiMax), Near Field Communication (NFC), Long Term Evolution (LTE), etc., or a wired communication device that supports Ethernet. The external device 200 is, for example, an electronic device such as a cloud server or a computer host. The disclosure is not limited thereto.

Through voice control, the user can change the expression or appearance of the biologically-modeled housing S according to the needs. In addition, since the projection data can be dynamic image data, in an embodiment, the projection system 100 can display the expression changing process of a human model from smiling (see FIG. 3A) to laughing (see FIG. 3B).

In another embodiment, the projection data stored in the storage device 140 is a facial expression module. The facial expression module includes various different emotion expressions of the same character, multiple graphical facial expressions or multiple facial expressions of a real person. For example, a facial expression module may include various facial expressions such as joys, angers, sorrows and happiness of the same character. The controller 130 can replace the facial expression module in the storage device 140 through the communication device 150. For example, the user can change the facial image of the biologically-modeled housing S through voice control, for example, changing the character's facial image. Or, initially the biologically-modeled housing S is presented with a cartoon facial image (that is, a graphic facial expression), and the user can choose to replace the appearance of the biologically-modeled housing S with a facial expression of a real person.

In this way, even if the capacity of the storage device 140 is limited, the projection system 100 can display a variety of appearances in the face projection area PA of the biologically-modeled housing S, rather than providing only a few options to the user.

In an embodiment, as shown in FIG. 1, the projection system 100 further includes a temperature sensing device 160. The temperature sensing device 160 is electrically connected to the controller 130 and configured to sense the ambient temperature. The projection device 110 may include an image processor 112. The controller 130 controls the image processor 112 to adjust the color temperature of the facial image according to the ambient temperature sensed by the temperature sensing device 160. Specifically, when the ambient temperature becomes higher, the color temperature value corresponding to the adjusted facial image becomes lower; when the ambient temperature becomes lower, the color temperature value of the adjusted facial image becomes higher.

Figure 4A:
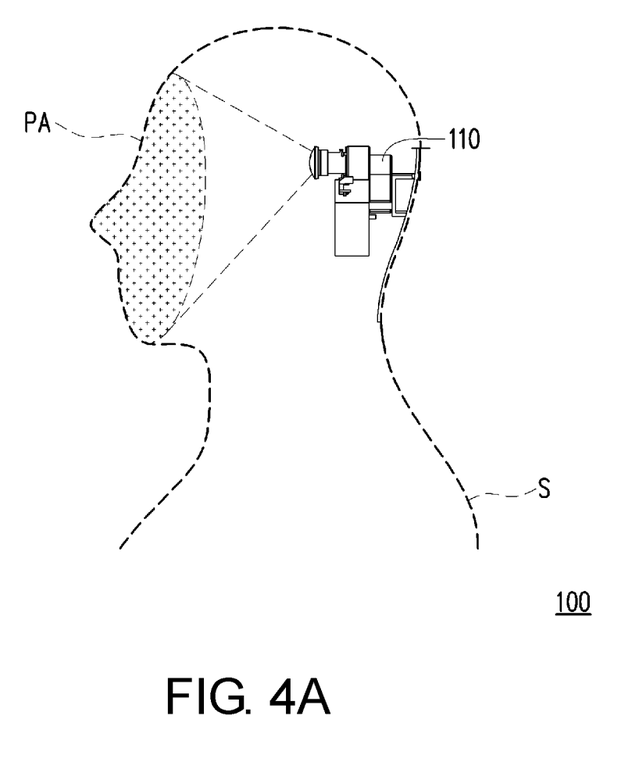
FIG. 4A and FIG. 4B are schematic views of facial images according to another two embodiments of the disclosure.
Figure 4B:
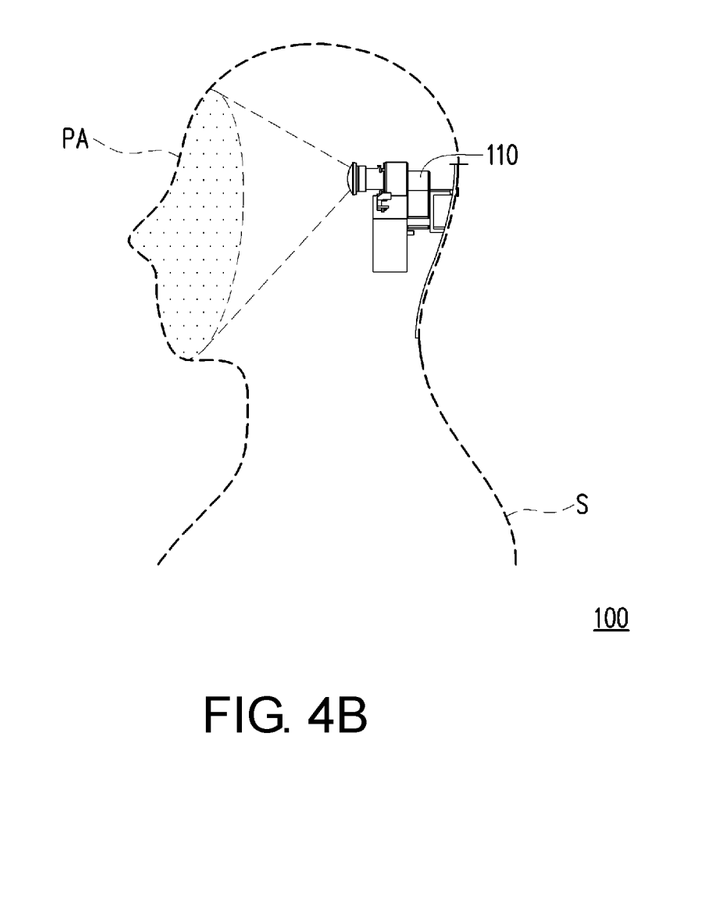

FIG. 4A and FIG. 4B are schematic views of facial images according to another two embodiments of the disclosure. In the embodiment of FIG. 4A, the controller 130 determines that the ambient temperature has increased, and therefore the image processor 112 will adjust the color temperature corresponding to the target projection data to be lower, for example, from 5500K to 5000K, such that the face color finally presented in the face projection area PA is shifted to a warm tone. In the embodiment of FIG. 4B, the controller 130 determines that the ambient temperature is reduced, and therefore the image processor 112 will adjust the color temperature corresponding to the target projection data to be higher, for example, from 5500K to 6000K, such that the face color finally presented in the face projection area PA is shifted to a cool tone. In this way, the projection system 100 of this embodiment can spontaneously adjust the color temperature of the facial image in response to the ambient temperature, thereby providing people with different visual experiences. When the weather gets warmer, the face color of the human model will become ruddy, and when the weather gets colder, the face color of the human model will also turn pale, making the human model more realistic.

In another embodiment, when the ambient temperature becomes higher, the color temperature value corresponding to the adjusted facial image becomes higher, and when the ambient temperature becomes lower, the color temperature value of the adjusted facial image also becomes lower. In another embodiment, the controller 130 can control the image processor 112 to adjust the color tone of the target projection data according to the ambient temperature. Those of ordinary skill in the art can make adjustments based on the above teachings and requirements, and the disclosure is not limited thereto.

Figure 5:
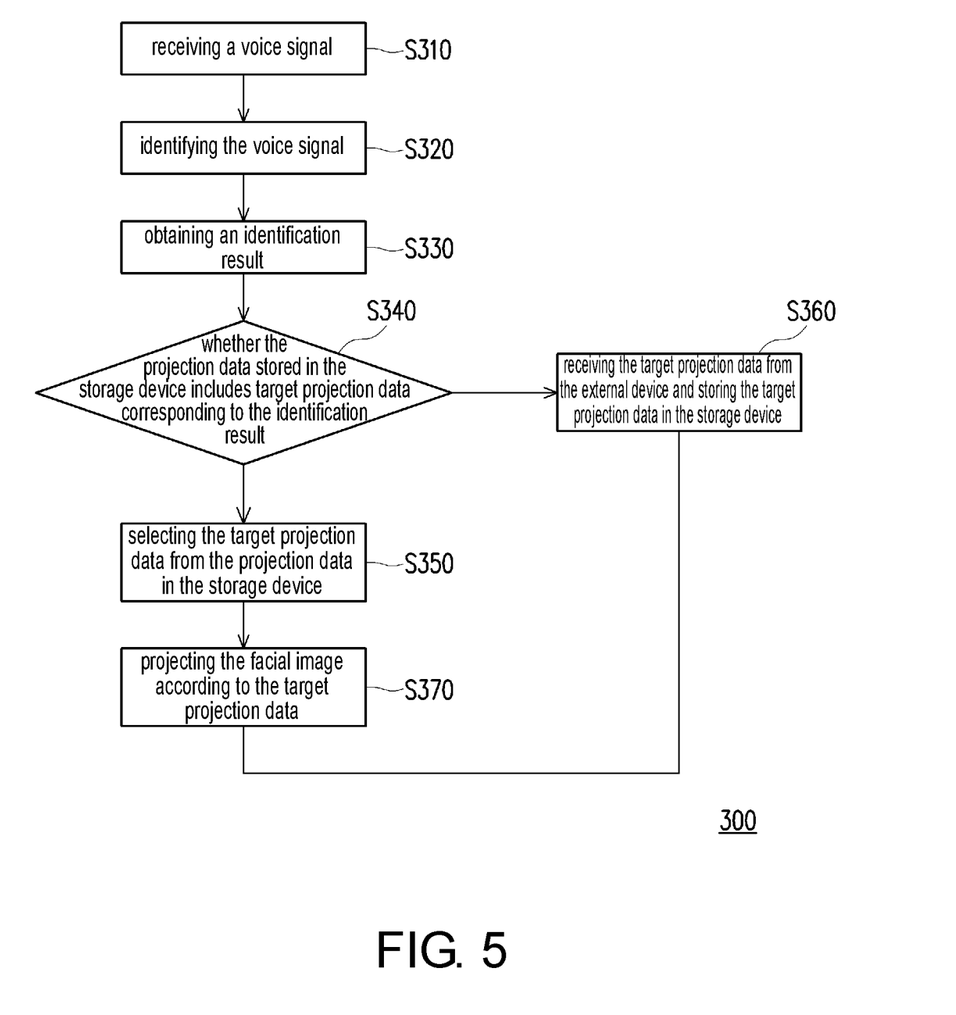
FIG. 5 is a flowchart of a projection operation method of a projection system according to an embodiment of the disclosure.

FIG. 5 is a flowchart of a projection operation method 300 of a projection system according to an embodiment of the disclosure. The projection operation method 300 can be applied to the above-mentioned projection system 100. The steps of the projection operation method 300 are described below with reference to the reference symbols used in the above embodiments.

In step S310, the projection system 100 receives the voice signal through the sound-receiving device 120. In step S320, the projection system 100 identifies the voice signal through the controller 130, and in step S330, the projection system 100 obtains the identification result according to the voice signal through the controller 130. Next, when the identification result is obtained, in step S340, it is determined whether the projection data stored in the storage device 140 includes target projection data corresponding to the identification result. If the projection data in the storage device 140 includes target projection data corresponding to the identification result, it means that the target projection data has been stored in the storage device 140, then step S350 is performed, and the projection system 100 selects the target projection data from the projection data in the storage device 140 through the controller 130. Specifically, the target projection data corresponding to the identification result can be selected through the aforementioned lookup table. Next, step S370 is performed, the controller 130 controls the projection device 110 to project the facial image onto the face projection area PA according to the target projection data.

However, if the projection data in the storage device 140 does not include the target projection data corresponding to the identification result, it means that currently the target projection data does not exist in the storage device 140, then step S360 is performed, and the controller 130 controls the communication device 150 to receive the target projection data corresponding to the identification result from the external device 200, and stores the target projection data in the storage device 140. Thereafter, step S370 can be performed to project the facial image according to the target projection data.

Figure 6:
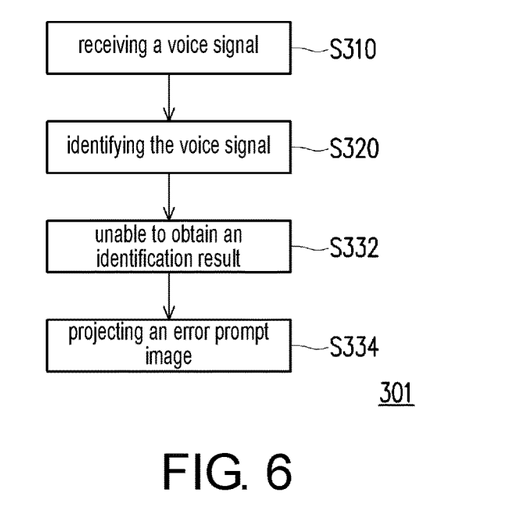
FIG. 6 is a flowchart of a projection operation method of a projection system according to still another embodiment of the disclosure.
Figure 7:
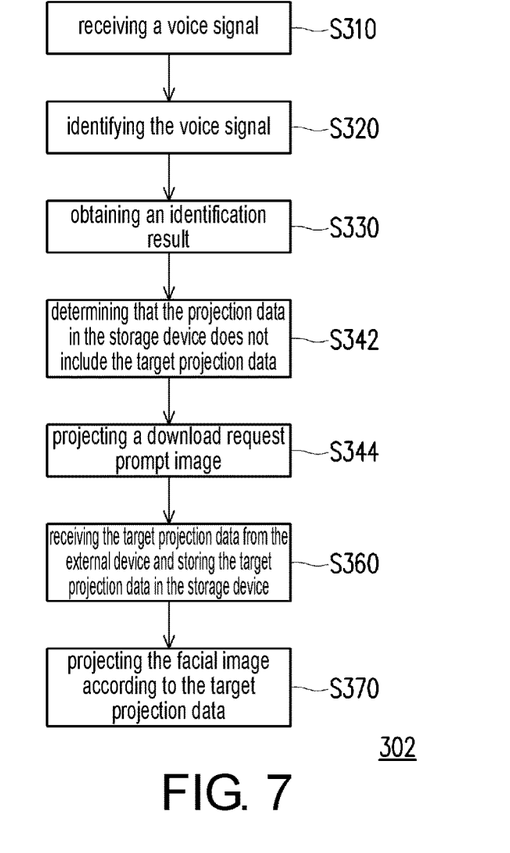
FIG. 7 is a flowchart of a projection operation method of a projection system according to yet another embodiment of the disclosure.
Figure 8:
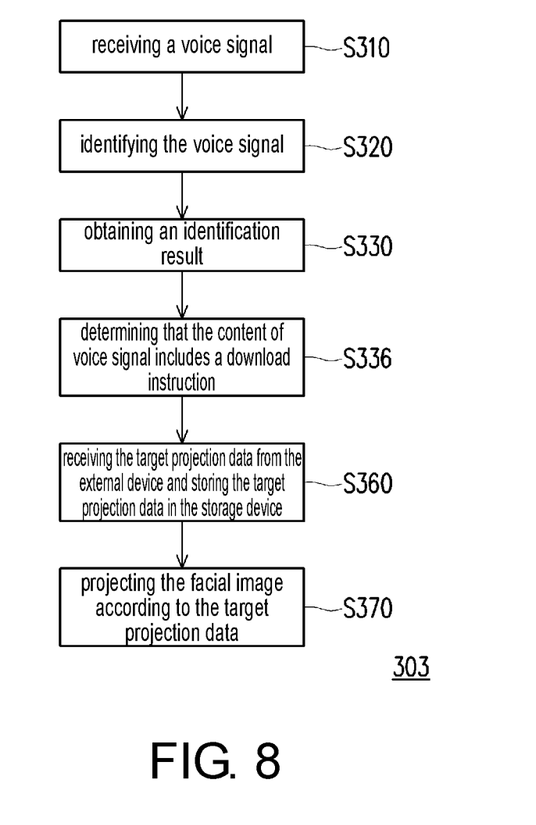
FIG. 8 is a flowchart of a projection operation method of a projection system according to still another embodiment of the disclosure.

FIG. 6 to FIG. 8 are flowcharts of projection operation methods of a projection system according to other embodiments of the disclosure. Specifically, FIG. 6 to FIG. 8 show projection operation methods 301 to 303 derived from the projection operation method 300 of FIG. 5, wherein the same reference number represents the same step, so related details are omitted.

In another embodiment, for example, when the background noise is too loud and the controller 130 does not support the identification of the language or vocabulary data contained in the voice signal, the controller 130 may not be able to identify the voice signal and cannot obtain the identification result. Therefore, as shown in FIG. 6, the aforementioned projection operation method 300 can be evolved into the projection operation method 301. Compared with the projection operation method 300, the projection operation method 301 can include receiving the voice signal in the step S310 and steps S332 and S334 performed after the identification of the voice signal in step S320. In step S332, the controller 130 cannot obtain the identification result according to the voice signal, and then proceed to step S334, the controller 130 controls the projection device 110 to project an error prompt image, indicating that the identification is failed, so that the user can obtain the identification failure information, and then consider providing other voice signals.

In another embodiment, as shown in FIG. 7, the projection operation method 300 can be evolved into the projection operation method 302. Compared to the projection operation method 300, the projection operation method 302 can include steps S342 and S344 performed after the aforementioned steps S310, S320, and S330. As shown in FIG. 7, after the identification result is obtained, in step S342, the controller 130 determines that the projection data in the storage device 140 does not include the target projection data. Then, before the step S360 in which the controller 130 controls the communication device 150 to receive the target projection data from the external device 200 and stores the target projection data in the storage device 140, step S344 is performed, and the controller 130 controls the projection device 110 to project the download request prompt image to notify and remind the user that the step of downloading data will be performed subsequently.

In another embodiment, as shown in FIG. 8, the projection operation method 300 can be evolved into the projection operation method 303. Compared with the projection operation method 300, the projection operation method 303 can include step S336 performed after the aforementioned steps S310, S320 and S330. When the identification result is obtained, if it has not been determined whether the projection data in the storage device 140 includes the target projection data, as shown in FIG. 8, step S336 may be performed first, and the controller 130 determines that the content of the voice signal includes a download instruction, then the aforementioned steps S360 and S370 are performed. Specifically, for example, if the user knows in advance that the target projection data does not exist in the storage device 140, the user can directly send a download instruction (e.g., "download laughing") to the projection system 100, so that the projection system 100 does not need to use the controller 130 to determine whether the target projection data exists in the storage device 140, and can directly download the target projection data (for example, the target projection data corresponding to "laughing") from the external device 200, thereby saving the time for the controller 130 to search for the target projection data.

Figure 9:
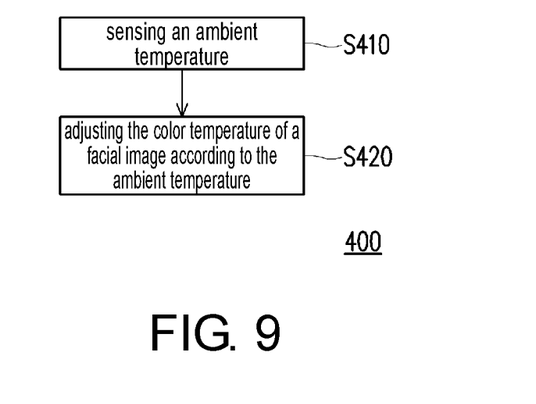
FIG. 9 is a flowchart of a projection operation method of a projection system according to yet another embodiment of the disclosure.

FIG. 9 is a flowchart of a projection operation method 400 of a projection system according to yet another embodiment of the disclosure. The projection operation method 400 can be applied to the above-mentioned projection system 100. The steps of the projection operation method 300 are described below with reference to the reference symbols used in the above embodiments. The projection operation method 400 may include steps S410 and S420. In step S410, the ambient temperature is sensed by the temperature sensing device 160. Then in step S420, the image processor 112 adjusts the color temperature of the facial image according to the ambient temperature sensed in step S410. In addition, the projection operation method 400 may be performed simultaneously with the aforementioned projection operation method 300, and the disclosure is not limited thereto.

Those of ordinary skill in the art can refer to the embodiments of FIG. 1 to FIG. 4 to know the implementation details of the projection operation methods 300, 301, 302, 303, and 400.

In summary, the embodiments of the disclosure have at least one of the following advantages or effects. The projection system and projection operation method of the disclosure allow the user to give instructions through the sound-receiving device to easily change the facial image of the biologically-modeled housing. In addition, through the function of automatically downloading target projection data from the external device, the facial images of the projection system can be diversified without consuming memory.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection system, comprising a biologically-modeled housing, a projection device, a sound-receiving device, a communication device, a storage device, and a controller, wherein:
    the biologically-modeled housing comprises a face projection area, and the face projection area is light-transmissive and curved;
    the projection device is disposed inside the biologically-modeled housing, and is configured to project a facial image onto the face projection area;
    the sound-receiving device is configured to receive a voice signal;
    the storage device is configured to store multiple projection data; and
    the controller is electrically connected with the projection device, the sound-receiving device, the communication device and the storage device,
    wherein the controller is configured to identify the voice signal, and when the controller obtains an identification result according to the voice signal,
        if the multiple projection data comprises target projection data corresponding to the identification result, the controller selects the target projection data from the multiple projection data and controls the projection device to project the facial image according to the target projection data, or
        if the multiple projection data does not comprise the target projection data, the controller controls the communication device to receive the target projection data from an external device and store the target projection data in the storage device, and the controller controls the projection device to project the facial image according to the target projection data,
    wherein the projection system further comprises a temperature sensing device, the temperature sensing device is electrically connected to the controller, and is configured to sense an ambient temperature,
    wherein the projection device comprises an image processor,
    wherein the controller controls the image processor to adjust a color temperature of the facial image according to the ambient temperature.

2. The projection system according to claim 1, wherein when the ambient temperature becomes higher, a color temperature corresponding to the adjusted facial image becomes lower.

3. The projection system according to claim 1, wherein the storage device further stores a lookup table, wherein the controller selects the target projection data corresponding to the identification result through the lookup table.

4. The projection system according to claim 1, wherein the content of the voice signal comprises descriptions of facial expressions, descriptions of appearance, descriptions of emotions or characters.

5. The projection system according to claim 1, wherein the multiple projection data is a facial expression module, and the controller is configured to replace the facial expression module in the storage device through the communication device, wherein the facial expression module comprises various emotion expressions of the same character, multiple graphic facial expressions or multiple facial expressions of a real person.

6. The projection system according to claim 1, wherein when the controller cannot obtain the identification result according to the voice signal, the controller controls the projection device to project an error prompt image.

7. The projection system according to claim 1, wherein when the controller obtains the identification result according to the voice signal and the controller determines that the multipole projection data does not comprise the target projection data, the controller controls the projection device to project a download request prompt image.

8. The projection system according to claim 1, wherein when the controller obtains the identification result according to the voice signal and the controller determines that the content of the voice signal comprises a download instruction, the controller controls the communication device to receive the target projection data corresponding to the identification result from the external device according to the download instruction, and stores the target projection data in the storage device.

9. A projection operation method for projecting facial images, the projection operation method comprising:
    receiving a voice signal through a sound-receiving device;
    identifying the voice signal through a controller;
    when an identification result is obtained according to the voice signal by the controller,
        if multiple projection data stored in a storage device comprises target projection data corresponding to the identification result, the target projection data is selected from the multiple projection data by the controller, or if the multiple projection data does not comprise the target projection data, the communication device is controlled by the controller to receive the target projection data from an external device and the target projection data is stored in the storage device;

a projection device is controlled by the controller to project the facial image onto a face projection area according to the target projection data, wherein the face projection area is located at a biologically-modeled housing, and the face projection area is light-transmissive and curved, wherein the projection device is disposed inside the biologically-modeled housing;

sensing an ambient temperature through a temperature sensing device; and adjusting a color temperature of the facial image according to the ambient temperature by an image processor.

10. The projection operation method according to claim 9, wherein when the ambient temperature becomes higher, adjusting a color temperature corresponding to the facial image to be lower.

11. The projection operation method according to claim 9, wherein the content of the voice signal comprises descriptions of facial expressions, descriptions of appearance, descriptions of emotions or characters.

12. The projection operation method according to claim 9, further comprising:

the multiple projection data is a facial expression module; and replacing the facial expression module in the storage device by the communication device, wherein the facial expression module comprises various emotion expressions of the same character, multiple graphic facial expressions or multiple facial expressions of a real person.

13. The projection operation method according to claim 9, wherein when the identification result cannot be obtained according to the voice signal through the controller, the projection device is controlled by the controller to project an error prompt image.

14. The projection operation method according to claim 9, wherein when the identification result is obtained according to the voice signal by the controller and it is determined by the controller that the multiple projection data does not comprise the target projection data, before the step in which the communication device is controlled by the controller to receive the target projection data from the external device and the target projection data is stored in the storage device, the projection device is controlled by the controller to project a download request prompt image.

15. The projection operation method according to claim 9, wherein when the identification result is obtained according to the voice signal by the controller and it is determined by the controller that the content of the voice signal comprises a download instruction, the controller controls the communication device to receive the target projection data corresponding to the identification result from the external device according to the download instruction and stores the target projection data in the storage device.

* * * * *